United States Patent [19]

Watanabe et al.

[11] Patent Number: 5,056,419
[45] Date of Patent: Oct. 15, 1991

[54] SEALING DEVICE FOR A PISTON ROD OF A STIRLING ENGINE

[75] Inventors: Tetsumi Watanabe, Okazaki; Tomokimi Mizuno, Chiryu; Hiroyuki Katsuda, Okazaki; Yutaka Momose, Anjo, all of Japan

[73] Assignee: Aisin Seiki Kabushiki Kaisha, Kariya, Japan

[21] Appl. No.: 552,228

[22] Filed: Jul. 13, 1990

[30] Foreign Application Priority Data

Jul. 21, 1989 [JP] Japan .................................. 1-190109

[51] Int. Cl.$^5$ .............................................. F15B 21/04
[52] U.S. Cl. ........................................ 92/80; 92/82; 277/15; 277/19; 60/517
[58] Field of Search ............. 92/80, 82, 86, 165, 92/168, 87, 163; 277/15-21; 60/517

[56] References Cited

U.S. PATENT DOCUMENTS

| | | | |
|---|---|---|---|
| 3,293,994 | 12/1966 | Napolitano | 92/165 R |
| 3,667,348 | 6/1972 | Neelson | 60/517 |
| 3,810,634 | 5/1974 | Hakansson | 277/15 |
| 3,848,877 | 11/1974 | Bengtsson et al. | 60/517 |
| 3,943,717 | 3/1976 | Schexnayder | 277/19 |
| 4,083,566 | 4/1978 | Bengtsson | 277/15 |
| 4,093,239 | 6/1978 | Sugahara | 277/15 |
| 4,206,928 | 6/1980 | Asano | 277/15 |
| 4,564,202 | 1/1986 | Momose | 277/15 |
| 4,597,322 | 7/1986 | Garnjost | 92/86 |
| 4,769,992 | 9/1988 | Harada et al. | 277/15 |

FOREIGN PATENT DOCUMENTS

| | | | |
|---|---|---|---|
| 3616001 | 11/1987 | Fed. Rep. of Germany | 60/517 |
| 0013252 | 1/1982 | Japan | 60/517 |
| 0206259 | 9/1987 | Japan | 60/517 |
| 0214259 | 9/1987 | Japan | 60/517 |
| 0085242 | 4/1988 | Japan | 60/517 |

Primary Examiner—Edward K. Look
Assistant Examiner—Thomas Denion
Attorney, Agent, or Firm—Burns, Doane, Swecker & Mathis

[57] ABSTRACT

The present invention relates to a sealing device provided between a piston rod of a Stirling cycle engine and a variable volume chamber. The sealing device is provided with an arrangement so as to equalize pressures between a seal chamber and the variable volume chamber of the Stirling cycle engine. By equalizing pressures between the respective spaces, an overpressure is prevented which would otherwise distort the seal and permit oil to be carried into the working volume of the Stirling cycle engine.

6 Claims, 2 Drawing Sheets

SEALING DEVICE FOR A PISTON ROD OF A STIRLING ENGINE

BACKGROUND OF THE INVENTION

1. Field of the Invention

The present invention relates to a sealing device for a piston rod of a Stirling engine and in particular to a sealing device for preventing invasion of oil into an operating space in a Stirling engine.

2. Description of the Related Art

As shown in FIG. 2, an expansion piston 2 is reciprocally fitted within an expansion cylinder 1 and an expansion chamber 3 is defined therebetween. The piston 2 is operatively connected, via a rod 4, to an output delivery mechanism (not shown) from which an output of the Stirling engine is obtained in the form of, e.g., rotational torque. Vibration of the rod 4 is prevented by a guide member 5 positioned in an intermediate member 6, thereby enabling unitary movement of the rod 4 with the piston 2 in the axial direction. An intermediate chamber 8 is defined between the member 6 and the piston 2. An oil-scraper seal 7 is secured to the intermediate member 6 in such manner that the seal 7 is in sliding contact with the outer periphery of the rod 4 so as to prevent oil, attached thereon, from invading or flowing into the intermediate chamber 8 upon movement of the rod 4 into the intermediate chamber 8. The oil removed by the seal is received in a space 9 defined between the seal 7 and the member 6 and is returned to the output delivery mechanism via a passage 10 formed in the member 6. The expansion chamber 3 is in fluid communication with a compression chamber (not shown) via a heater 11 to be heated to a high temperature by any suitable means for providing a heat source. A regenerator 12 and cooler 13 are connected between the compression chamber and the expansion chamber 3.

Due to the reciprocal movement of the piston 2 in the vertical direction, a pressure P1 in the intermediate chamber 8 will vary. On the other hand, due to the fact that the space 9 is connected to the output delivery mechanism which has a large volume of space, a pressure P2 in the space 9 will vary over a small range, thereby creating a relationship in which P1 is greater than P2. In view of this relationship, the seal 7 moves in a direction away from the outer periphery of the rod 4 or has decreased contact pressure therewith, thereby permitting flow of oil on the rod 4 into the intermediate chamber 8. Thus, the oil is mixed with the operating fluid and the resulting operating fluid contaminates the heater 11, the regenerator 12 and the cooler 13. In addition, carbonization of the oil may stop up the passages through which the operating fluid passes, thereby decreasing the output power and/or efficiency of the engine.

SUMMARY OF THE INVENTION

It is, therefore, an object of the present invention to provide a sealing device for a piston rod of a Stirling engine without the foregoing drawbacks.

In order to attain the foregoing object, a sealing device for a rod of a Stirling Engine has a piston connected to the rod so as to obtain an output therefrom. The rod reciprocates through an intermediate member to which an oil-scraper seal is fixed thereto so as to be positioned between the piston and the intermediate member. The oil seal has an outer periphery secured to the intermediate member and an inner periphery in sealing contact with the outer periphery of the rod under a predetermined pressure to prevent the flow or invasion of oil on the outer periphery of the rod into an.-intermediate chamber between the piston and the intermediate member. A space is defined between the oil-scraper seal and the intermediate member, and a one-way valve permits the fluid-flow from the chamber to the space.

BRIEF DESCRIPTION OF THE DRAWINGS

Additional objects and advantages of the present invention will become more apparent from the following detailed description of a preferred embodiment thereof when considered with reference to the attached drawings, in which.

DETAILED DESCRIPTION OF A PREFERRED EMBODIMENT

Figure 1:
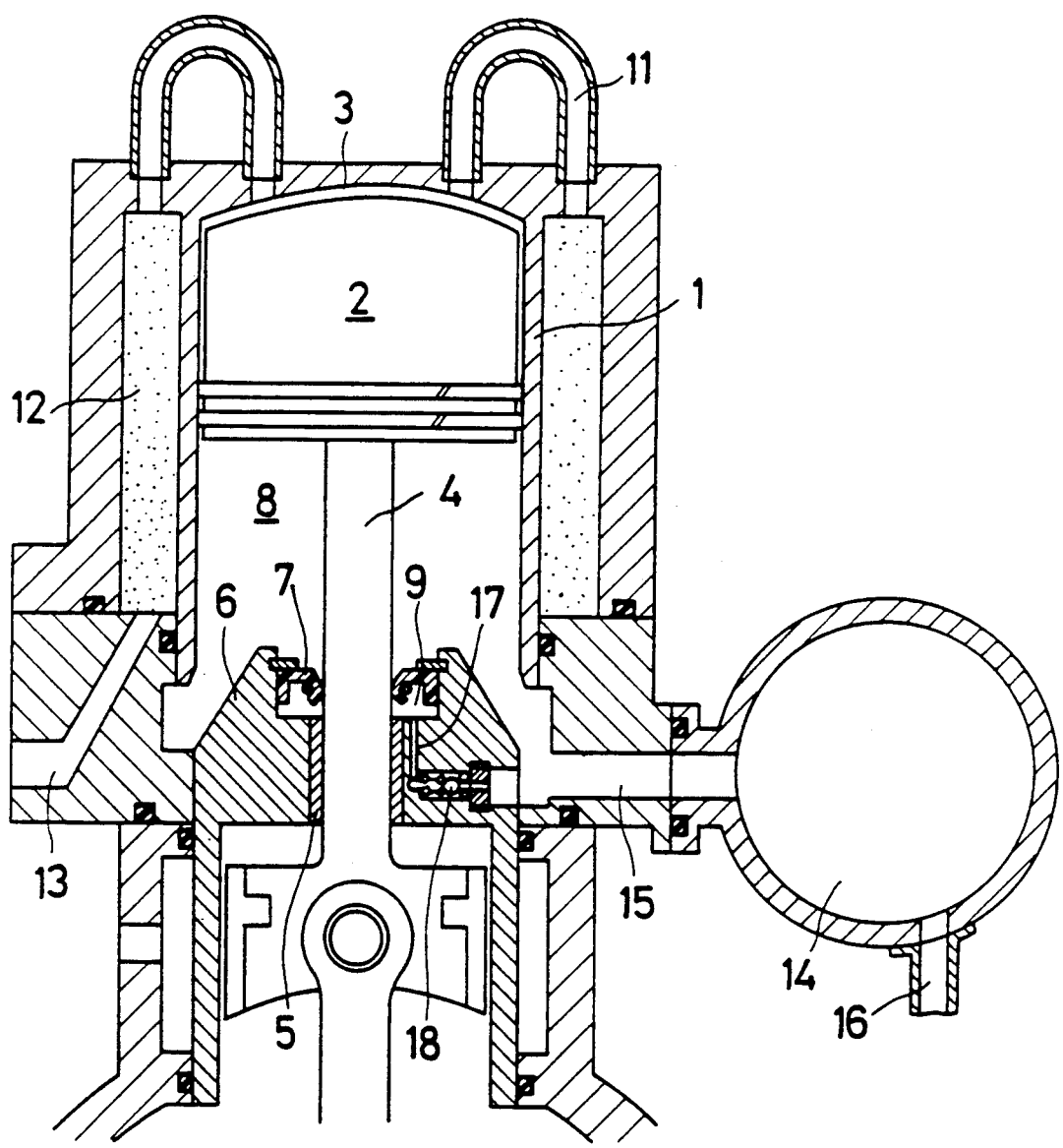
FIG. 1 is a cross-sectional view of a sealing device according to the present invention.
Figure 2:
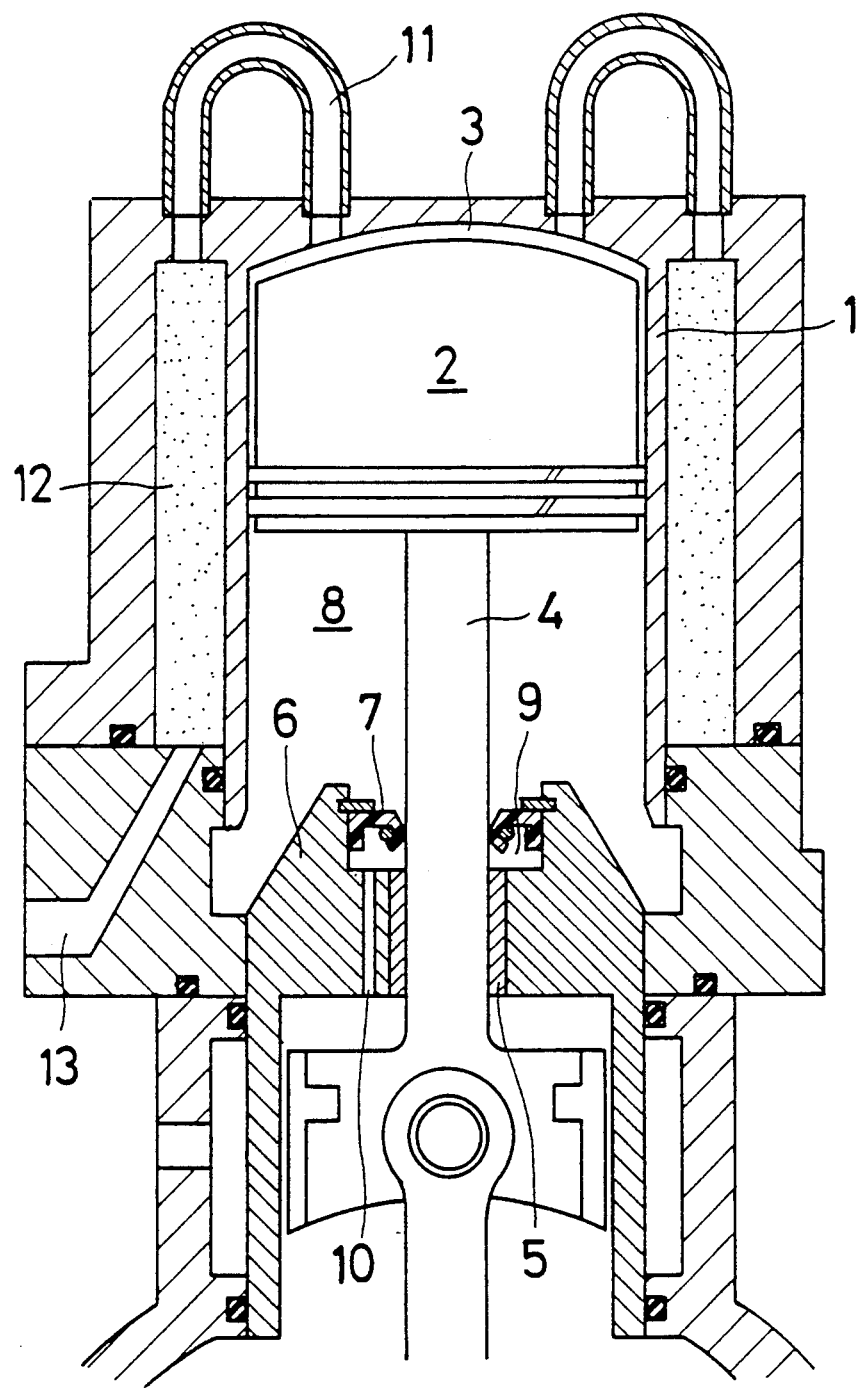
FIG. 2 is a cross-sectional view of a conventional sealing device.

Referring now to FIG. 1, there is illustrated an embodiment of a sealing device according to the present invention. A Stirling engine 10 includes a cylinder 1 which is integrally formed with a buffer chamber 14. The buffer chamber 14 is in fluid communication, via a passage 15, with an intermediate chamber 8 defined below an expansion piston 2. The buffer chamber 14 is also in fluid communication, via passage 16, with an intermediate chamber (not shown) defined below a compression piston (not shown).

An intermediate member 6 is provided with a passage 17 which is in fluid communication with the passage 15, the passage 16 and a space in which oil removed from the piston rod 4 is stored. Vibration of the rod 4 is prevented by a guide member 5 positioned in the intermediate member 6 between the rod 4 and the member 6. A one-way valve 18 is disposed in the passage 17 for permitting fluid-flow from the passage 15 and chamber 8 into the passage 17.

The one-way valve permits the fluid-flow from the intermediate chamber 8 into a space 9 which is defined within the member 6. If a pressure P1 in the intermediate chamber 8 becomes larger than a pressure P2 in the space 9, the one-way valve 18 is opened due to the pressure differential thereacross, thereby introducing the higher pressure P1 into the space 9. The pressure P1 in the intermediate chamber 8 is then equalized with or is less than the pressure P2 in the space 9. Thus, a pressure differential between the intermediate chamber 8 and space 9 will not be generated to remove or separate the oilscraper seal 7 from the outer periphery of the rod 4 connected. This means that the contact pressure of the oil-scraper seal 7 to the outer periphery of the rod 4 is maintained so as to permit the function of the oil-scraper seal 7 to be maintained. It should be noted that the oil, after being scraped by the seal 7, is returned from the space 9 to the output delivery mechanism (not shown) via a passage (not shown) thereby preventing a pressure increase in the space 9.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A sealing device for a rod of a Stirling engine comprising:
    a piston connected to the rod for obtaining the output of the engine therefrom;
    an intermediate member through which the rod is reciprocally guided;
    an intermediate chamber provided between the piston and the intermediate member;
    an oil-scraper seal having an outer periphery secured to the intermediate member and an inner periphery in sealing contact with an outer periphery of the rod, said seal preventing introduction of oil from said rod into said chamber;
    a space defined between the oil-scraper seal and the intermediate member;
    a passageway extending between said chamber and said space; and
    a one-way valve positioned in said passageway for permitting communication from the intermediate chamber to the space.

2. A sealing device according to claim 1, wherein the piston is an expansion piston.

3. A sealing device according to claim 1 further comprising a guide member positioned between the intermediate member and the rod.

4. A sealing device according to claim 1, further comprising a buffer chamber in continuous fluid communication with said intermediate chamber.

5. A sealing device according to claim 1, wherein said valve is spring biased

6. A sealing device according to claim 1, wherein said valve comprises a small inlet orifice.

* * * * *